United States Patent
Perez et al.

(10) Patent No.: US 9,812,127 B1
(45) Date of Patent: Nov. 7, 2017

(54) REACTIVE LEARNING FOR EFFICIENT DIALOG TREE EXPANSION

(71) Applicant: Conduent Business Services, LLC, Dallas, TX (US)

(72) Inventors: Julien Perez, Grenoble (FR); Nicolas Monet, Montbonnot-Saint-Martin (FR)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/142,187

(22) Filed: Apr. 29, 2016

(51) Int. Cl.
G10L 15/22 (2006.01)
G06F 17/27 (2006.01)
G06F 17/24 (2006.01)
G10L 15/06 (2013.01)

(52) U.S. Cl.
CPC ............ G10L 15/22 (2013.01); G06F 17/241 (2013.01); G06F 17/279 (2013.01); G10L 15/063 (2013.01); G10L 2015/0635 (2013.01)

(58) Field of Classification Search
CPC ..................................................... G10L 15/22
See application file for complete search history.

(56) References Cited

U.S. PATENT DOCUMENTS

| | | | |
|---|---|---|---|
| 2005/0143138 A1 | 6/2005 | Lee et al. | |
| 2007/0219798 A1* | 9/2007 | Wang | G10L 15/063 704/257 |
| 2009/0119104 A1* | 5/2009 | Weng | G10L 15/22 704/244 |
| 2009/0119586 A1* | 5/2009 | Weng | G06Q 10/06 715/705 |
| 2010/0057463 A1* | 3/2010 | Weng | G06F 17/27 704/257 |
| 2010/0124325 A1* | 5/2010 | Weng | G10L 15/22 379/265.11 |
| 2010/0161596 A1* | 6/2010 | Yan | G06F 17/30675 707/723 |
| 2012/0150836 A1* | 6/2012 | He | G06F 17/30864 707/708 |
| 2012/0233159 A1* | 9/2012 | Datta | G06F 17/30256 707/728 |

(Continued)

OTHER PUBLICATIONS

Auer, "Using confidence bounds for exploitation-exploration trade-offs," J. Mach. Learn. Res., vol. 3, pp. 397-422 (2003).

(Continued)

Primary Examiner — Douglas Godbold
(74) Attorney, Agent, or Firm — Fay Sharpe LLP

(57) ABSTRACT

A method for generating dialogs for learning a dialog policy includes, for each of at least one scenario, in which annotators in a pool of annotators serve as virtual agents and users, generating a respective dialog tree in which each path through the tree corresponds to a dialog and nodes of the tree correspond to dialog acts provided by the annotators. The generation includes computing a measure of uncertainty for nodes in the dialog tree, identifying a next node to be annotated, based on the measure of uncertainty, selecting an annotator from the pool to provide an annotation for the next node, receiving an annotation from the selected annotator for the next node, and generating a new node of the dialog tree based on the received annotation. A corpus of dialogs is generated from the dialog tree.

18 Claims, 8 Drawing Sheets

(56) References Cited

U.S. PATENT DOCUMENTS

| | | | | |
|---|---|---|---|---|
| 2012/0308121 | A1* | 12/2012 | Datta | G06F 17/3028 382/155 |
| 2014/0222426 | A1* | 8/2014 | Di Fabbrizio | G10L 15/063 704/243 |
| 2014/0250378 | A1* | 9/2014 | Stifelman | G06F 3/048 715/708 |
| 2014/0288932 | A1* | 9/2014 | Yeracaris | G10L 15/30 704/249 |

OTHER PUBLICATIONS

Benedi, et al., "Design and acquisition of a telephone spontaneous speech dialogue corpus in Spanish: Dihana," Proc. 5th LREC, pp. 1636-1639 (2006).
Bernsen, "Designing Interactive Speech Systems: from First Ideas to User Testing," Springer-Verlag, Berlin, pp. 2-14 (1998).
Boutilier, et al., "Accelerating reinforcement learning through implicit imitation," CoRR, abs/1106.0681, pp. 569-629 (2011).
Coates, et al., "Apprenticeship learning for helicopter control," Commun. ACM, vol. 52(7), pp. 97-105 (2009).
Coquelin, et al., "Bandit Algorithms for Tree Search," Uncertainty in Artificial Intelligence, Vancouver, Canada, pp. 67-74 (2007).
Dai, et al., "POMDP-based control of workflows for crowdsourcing," Artif. Intell., vol. 202, pp. 52-85 (2013).
Dupret, et al., "Model based comparison of discounted cumulative gain and average precision," J. Discrete Algorithms, 18, pp. 49-62 (2013).
Fiedler, et al., "Supporting progressive refinement of Wizard-of-Oz experiments," 6th Int'l Conf. on Intelligent Tutoring Systems (ITS '02), Workshop on Empirical Methods for Tutorial Dialogue, pp. 62-69 (2002).
Fraser, et al., "Simulating speech systems," Computer Speech and Language, vol. 5(1), pp. 81-99 (1991).
Henderson, et al., "Mixture model POMDPs for efficient handling of uncertainty in dialogue management," ACL (Short Papers), pp. 73-76, ACL (2008).
Kearns, et al., "CobotDS: A spoken dialogue system for chat," Proc. 18th Nat'l Conf. on Artificial Intelligence and 14th Conf. on Innovative Applications of Artificial Intelligence (AAAI/IAAI-02), pp. 425-430 (2002).
Kelley, "An empirical methodology for writing user-friendly natural language computer applications," Proc. ACM CHI '83 Conf. on Human Factors in Computing Systems, Intelligent Interfaces, pp. 193-196 (1983).
Kerly, et al., "The potential for chatbots in negotiated learner modelling: A Wizard-of-Oz study," Proc. $8^{th}$ Int'l Conf. on Intelligent Tutoring Systems (ITS 2006), Lecture Notes in Computer Science, vol. 4053, pp. 443-452 (2006).
Klemmer, et al., "SUEDE: A Wizard of Oz prototyping tool for speech user interfaces," Proc. 13th Annual Symp. on User Interface Software and Technology (UIST-00), pp. 1-10 (2000).
Lewis, et al., "Heterogeneous uncertainty sampling for supervised learning," Proc. 11th Int'l Conf. on Machine Learning, pp. 148-156 (1994).
Lin, et al., "To re(label), or not to re(label)," 2nd AAAI Conf. on Human Computation and Crowdsourcing (HCOMP), pp. 1-8 (2014).

Li, et al., "Temporal supervised learning for inferring a dialog policy from example conversations," Proc. IEEE Spoken Language Technology Workshop (SLT), pp. 312-317 (2014).
Munteanu, et al., "MDWOZ: A Wizard of Oz environment for dialog systems development," LREC. European Language Resources Association, pp. 1-4 (2000).
Makino, et al., "Apprenticeship learning for model parameters of partially observable environments," ICML, pp. 1495-1502 (2012).
Ng, et al., "Algorithms for inverse reinforcement learning," Proc. 17th Int'l Conf. on Machine Learning, pp. 663-670 (2000).
Neu, et al., "Apprenticeship learning using inverse reinforcement learning and gradient methods," CoRR, abs/1206.5264, 2012, originally published in Proc. 23rd Conf. on Uncertainty in Artificial Intelligence (UAI), pp. 295-302 (2007).
Panagiotis, et al., "Repeated labeling using multiple noisy labelers," Data Min. Knowl. Discov., vol. 28(2), pp. 402-441 (2014).
Rieser, "Bootstrapping reinforcement learning-based dialogue strategies from Wizard-of-Oz data," PhD thesis, Saarland University, pp. 1-330 (2008).
Rizzo, et al., "A semi-automated Wizard of Oz interface for modeling tutorial strategies," Proc. 10th Int'l Conf. on User Modeling (UM 2005), Jul. 24-29, 2005, Lecture Notes in Computer Science, vol. 3538, pp. 174-178 (2005).
Rosset, et al., "Design strategies for spoken language dialog systems," EUROSPEECH. ISCA, pp. 1535-1538 (1999).
Scherer, et al., "A flexible Wizard of Oz environment for rapid prototyping," LREC. European Language Resources Association, pp. 958-961 (2008).
Schlögl, et al., "WebWOZ: a Wizard of Oz prototyping framework," EICS, pp. 109-114, ACM (2010).
Settles, "Active Learning. Synthesis Lectures on Artificial Intelligence and Machine Learning," pp. 1-114, Morgan & Claypool, Publishers (2012).
Sheng, et al., "Get another label? Improving data quality and data mining using multiple, noisy labelers," Proc. 14th ACM SIGKDD Int'l Conf. on Knowledge Discovery and Data Mining, pp. 614-622 (2008).
Sutton, et al., "Reinforcement Learning: An Introduction," The MIT Press, Cambridge, MA, pp. 1-29 (1998).
Sutton, et al. The CSLU toolkit: Rapid prototyping of spoken language systems, ACM Symp. on User Interface Software and Technology, pp. 85-86 (1997).
Tsiakas, et al., "A multimodal adaptive dialogue manager for depressive and anxiety disorder screening: A Wizard-of-Oz experiment," Proc. 8th ACM Int'l Conf. on Pervasive Technologies Related to Assistive Environments, Article No. 82, pp. 1-4 (2015).
Voorhees, "Evaluation by highly relevant documents," Proc. 24th Ann. Int'l ACM SIGIR Conf. on Research and Development in Information Retrieval, pp. 74-82 (2001).
Williams, et al., "Using Wizard-of-Oz simulations to bootstrap reinforcement—learning-based dialog management systems," Proc. SIGDIAL Workshop on Discourse and Dialogue, pp. 1-5 (2003).
Williams, et al., "Partially observable Markov decision processes for spoken dialog systems," Computer Speech & Language, 21(2), pp. 393-422 (2007).
Wyard, et al., "A realistic Wizard of Oz simulation of a multimodal spoken language system," $5^{th}$ Int'l Conf. on Spoken Language Processing (ICSLP) ISCA, pp. 1-4 (1998).
Young, "Using POMDPs for dialog management," 2006 IEEE ACL Spoken Language Technology Workshop, SLT 2006, pp. 8-13 (2006).

* cited by examiner

REACTIVE LEARNING FOR EFFICIENT DIALOG TREE EXPANSION

BACKGROUND

The exemplary embodiment relates to the field of dialog systems and finds particular application in connection with a system and method for expanding a dialog tree for learning a dialog system.

Spoken dialog systems (SDS) have recently become widely used in human-computer interfaces, especially for access to various public information systems. These system use a virtual agent to conduct a dialogue with a client using a dialog manager to predict the next utterance of the agent. Despite their widespread use, there are still a number of challenges that have slowed their development. Among these are the time and cost of building such systems and the lack of expertise and training data. Various methods for developing SDS have been proposed, including statistical learning approaches, such as Reinforcement Learning (RL) (R. S. Sutton, et al., "Reinforcement Learning: An Introduction," MIT Press, 1998), and rule-based hand-coded methods (Steve J. Young, "Using POMDPs for dialog management," 2006 IEEE ACL Spoken Language Technology Workshop, pp. 8-13, 2006). Statistical learning methods offer several advantages over rule-based approaches. These include a data-driven development cycle, provably optimal action policies, a precise mathematical model for action selection, possibilities for generalization to unseen states and automatic optimization of competing trade-offs in the objective function. However, a problem with statistical approaches is that they rely on the availability of a large quantity of data.

In cases when a fixed dataset is used for learning, the optimal policy can only be discovered when it is present within the data (Andrew Y. Ng, et al., "Algorithms for inverse reinforcement learning," Proc. 17th Intl Conf. on Machine Learning, pp. 663-670, 2000). However, in a reinforcement learning setting, dialog datasets have often been seen as an opportunity to propose a dialog policy before deployment and then making improvements to it throughout the reinforcement learning process of exploitation and exploration (Craig Boutilier, et al., "Accelerating reinforcement learning through implicit imitation," CoRR, abs/1106.0681, 2011, Verena Rieser, "Bootstrapping reinforcement learning-based dialogue strategies from Wizard-of-Oz data," PhD thesis, Saarland University, 2008).

Another approach is to generate data automatically from prior knowledge, like generative grammars. A problem with this approach is that the interaction models built off-line using handcrafted conversational models are often poor approximations of the way humans actually interact with computers. To overcome some of these problems, a technique known as the Wizard of Oz method was introduced (see, e.g., J. F. Kelley, "An empirical methodology for writing user-friendly natural language computer applications," Proc. ACM CHI '83 Conf. on Human Factors in Computing Systems, Intelligent Interfaces, pp. 193-196, 1983; N. M. Fraser, et al., "Simulating speech systems," Computer Speech and Language, 5(1):81-99, 1991; "Handbook of Standards and Resources for Spoken Language Systems," Daffyd Gibbon, et al., eds, Mouton de Gruyter, Berlin, 1997; Niels Ole Bernsen, "Designing Interactive Speech Systems: from First Ideas to User Testing," Springer-Verlag, Berlin, 1998). The method takes its name from Frank Baum's story, "The Wonderful Wizard of Oz," in which the wizard, in this case, a human, simulates a dialog system and collects data to be used for building a conversational model. The idea behind the method was that human simulation can be an efficient empirical method for developing user-friendly natural language applications by adopting a controlled and scenario based authoring approach of dialog generation.

For such a simulation to be as close as possible to the final system's behavior, a number of appropriate supporting tools are needed. In the ideal case, these tools should offer the possibility for the wizard to control all parts of a dialog system, specifically, speech recognition, semantic analysis, dialog management, domain knowledge base, natural language generation, and text-to-speech conversion (Sophie Rosset, et al., "Design strategies for spoken language dialog systems," EUROSPEECH. ISCA, pp. 1535-1538, 1999). While publicly-available software for building dialog systems exits such as the CSLU Toolkit (Stephen Sutton, et al., "The CSLU toolkit: Rapid prototyping of spoken language systems, ACM Symp. on User Interface Software and Technology, pp. 85-86, 1997), none of these tools supports application of the Wizard of Oz technique.

Examples of finite-state based systems for designing and conducting such experiments include MDWOZ (Cosmin Munteanu, et al., "MDWOZ: A Wizard of Oz environment for dialog systems development," LREC. European Language Resources Association, 2000) and SUEDE (Scott R. Klemmer, et al., "SUEDE: A Wizard of Oz prototyping tool for speech user interfaces," Proc. 13th Annual Symp. on User Interface Software and Technology (UIST-00), pp. 1-10 (2000). MDWOZ features a distributed client-server architecture and includes modules for database access as well as visual graph drawing and inspection to formalize the dialog automata. SUEDE provides a GUI and a browser-like environment for running experiments, and an "analysis mode" in which the experimenter can easily access and review the collected data. A drawback of these systems, however, is that they only allow finite-state dialogue modeling, which is restricted in its expressiveness.

One proposed method, in the context of tutoring dialog model learning, uses a mechanism of "progressive refinement" but without formal definition of the process (Armin Fiedler, et al., "Supporting progressive refinement of Wizard-of-Oz experiments," 6th Intl Conf. on Intelligent Tutoring Systems, Workshop on Empirical Methods for Tutorial Dialogue, pp. 62-69, 2002). More recently, web-based platforms for performing Wizard of Oz, named WebOz, have been proposed in order to simplify the distribution of the workflow of annotation (Stephan Schlögl, et al., "WebWOZ: a Wizard of Oz prototyping framework," EICS, pp. 109-114, ACM, 2010). However, no mechanism of active or reactive learning of dialog-tree expansion in the context of Wizard of Oz experiments has been suggested.

There remains a need for an Active Wizard of Oz method which is able to support efficient and task-oriented dialog experiments for producing usable data for dialog policy learning independently of a chosen policy learning model.

INCORPORATION BY REFERENCE

The following references, the disclosures of which are incorporated herein by reference in their entireties, are mentioned:

U.S. application Ser. No. 15/005,133, filed Jan. 25, 2016, entitled COMPLEXITY AWARE CALL-STEERING STRATEGY IN HETEROGENEOUS HUMAN/MACHINE CALL-CENTER ENVIRONMENTS, by Julien Perez, et al.

Training systems for speech recognition and spoken dialogue systems are described for example, in U.S. Pub. No. 20140222426, published Aug. 7, 2014, entitled SYSTEM AND METHOD OF PROVIDING AN AUTOMATED DATA-COLLECTION IN SPOKEN DIALOG SYSTEMS, by Giuseppe Di Fabbrizio; et al.; U.S. Pub. No. 20070219798, published Sep. 20, 2007, entitled TRAINING SYSTEM FOR A SPEECH RECOGNITION APPLICATION, by Ye-Yi Wang, et al.; U.S. Pub. No. 20090119104, published May 7, 2009, entitled SWITCHING FUNCTIONALITY TO CONTROL REAL-TIME SWITCHING OF MODULES OF A DIALOG SYSTEM, by Fuliang Weng; et al.; U.S. Pub. No. 20090119586, published May 7, 2009, entitled AUTOMATIC GENERATION OF INTERACTIVE SYSTEMS FROM A FORMALIZED DESCRIPTION LANGUAGE, by Fuliang Weng, et al.; U.S. Pub. No. 20140250378, published Sep. 4, 2014, entitled USING HUMAN WIZARDS IN A CONVERSATIONAL UNDERSTANDING SYSTEM, by Lisa Stifelman, et al.; U.S. Pub. No. 20050143138, published Jun. 30, 2005, entitled PROACTIVE USER INTERFACE INCLUDING EMOTIONAL AGENT, by Jong-Goo Lee, et al.

BRIEF DESCRIPTION

In accordance with one aspect of the exemplary embodiment, a method for generating dialogs for learning a dialog policy includes, for each of at least one scenario, in which annotators in a pool of annotators serve as virtual agents and users, generating a respective dialog tree in which each path through the tree corresponds to a dialog and nodes of the tree correspond to dialog acts provided by the annotators. The generation includes computing a measure of uncertainty for nodes in the dialog tree, identifying a next node to be annotated, based on the measure of uncertainty, selecting an annotator from the pool to provide an annotation for the next node, receiving an annotation from the selected annotator for the next node, and generating a new node of the dialog tree based on the received annotation. A corpus of dialogs is generated from the dialog tree.

One or more of the steps of the method may be performed with a processor.

In accordance with another aspect of the exemplary embodiment, a system for generating dialogs for learning a dialog policy includes memory which stores a dialog tree for each of a plurality of scenarios, wherein paths through the tree correspond to respective dialogs and nodes of the tree each represent a turn of a dialog. A tree update component updates the dialog trees based on annotations of annotators in a pool of annotators serving as virtual agents and users. A reactive tree expansion component progressively expands the dialog trees by repeated selection of a next node to be annotated by one of the annotators in the pool, the next node being selected based on a computed measure of uncertainty for nodes in the dialog trees. A dialog corpus generator generates a corpus of dialogs from the expanded dialog trees. A processor implements the tree update component, reactive tree expansion component, and dialog corpus generator.

In accordance with another aspect of the exemplary embodiment, a method for learning a dialog policy includes storing a respective dialog tree in memory for each of a plurality of scenarios, wherein paths through the tree correspond to respective dialogs and nodes of the tree each represent a turn of a dialog. The method further includes progressively expanding the dialog trees by repeated selection of a next node to be annotated by one of a pool of annotators, the next node being selected based on a computed measure of uncertainty for nodes currently in the dialog trees, and updating the dialog trees based on the annotation of the one annotators in the pool of annotators, generating a corpus of dialogs from the expanded dialog trees, and learning a dialog policy based on the corpus.

One or more of the steps of the method may be performed with a processor.

DETAILED DESCRIPTION

Aspects of the exemplary embodiment relate to a system and method for generating a dialog corpus through efficient tree expansion, based on reactive learning, which can reduce the time taken in preparing simulations, provide easy ways to collect data in realistic conditions, and facilitate the building of new autonomous and task-oriented dialog systems.

The dialog corpus can be used, for example, to generate a dialog policy for question-answering, conducting transactions, or diagnosis, or other conversational systems. The system and method are able to produce usable data for dialog policy learning independently of the chosen policy learning model.

Dialog data production is achieved in the exemplary method through a reactive learning formulation using a Wizard of Oz (WOZ) approach in which a human simulates a virtual agent for conducting a dialog with client. An efficient method is described herein for producing valuable dialog data in order to initialize a policy learning mechanism, such as reinforcement learning or imitative learning for dialog management. Using an active tree expansion model based on a reactive learning sampling strategy, more useful data can be produced in less time than in conventional WOZ approaches to data collection. The method reduces the amount of data which needs to be collected by avoiding low information redundancy and maximizing information gain in region of a dialog tree associated with a given dialog scenario. The approach can produce directly usable data for any dialog policy learning approach, for use in troubleshooting, conducting transactions, pro-active upselling, and the like.

A "dialog policy" is a component of a dialog system that examines the current state of the dialog, and decides what action to perform using a learned mapping function. The action is converted to a next utterance of a virtual agent.

Figure 1:
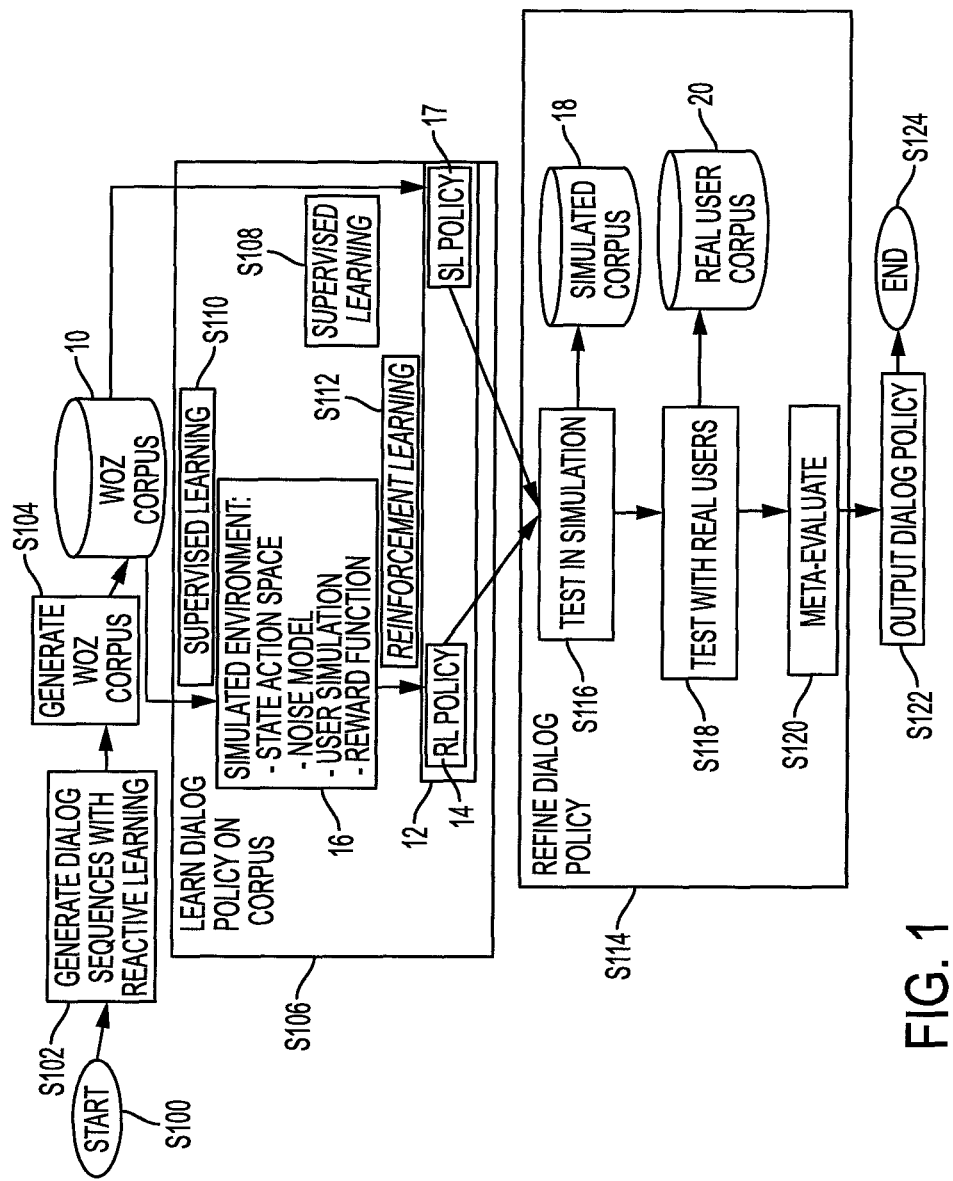
FIG. 1 is a flow chart illustrating a method of generating dialogs and generating a dialog policy for use in a dialog system, in accordance with one aspect of the exemplary embodiment.
Figure 2:
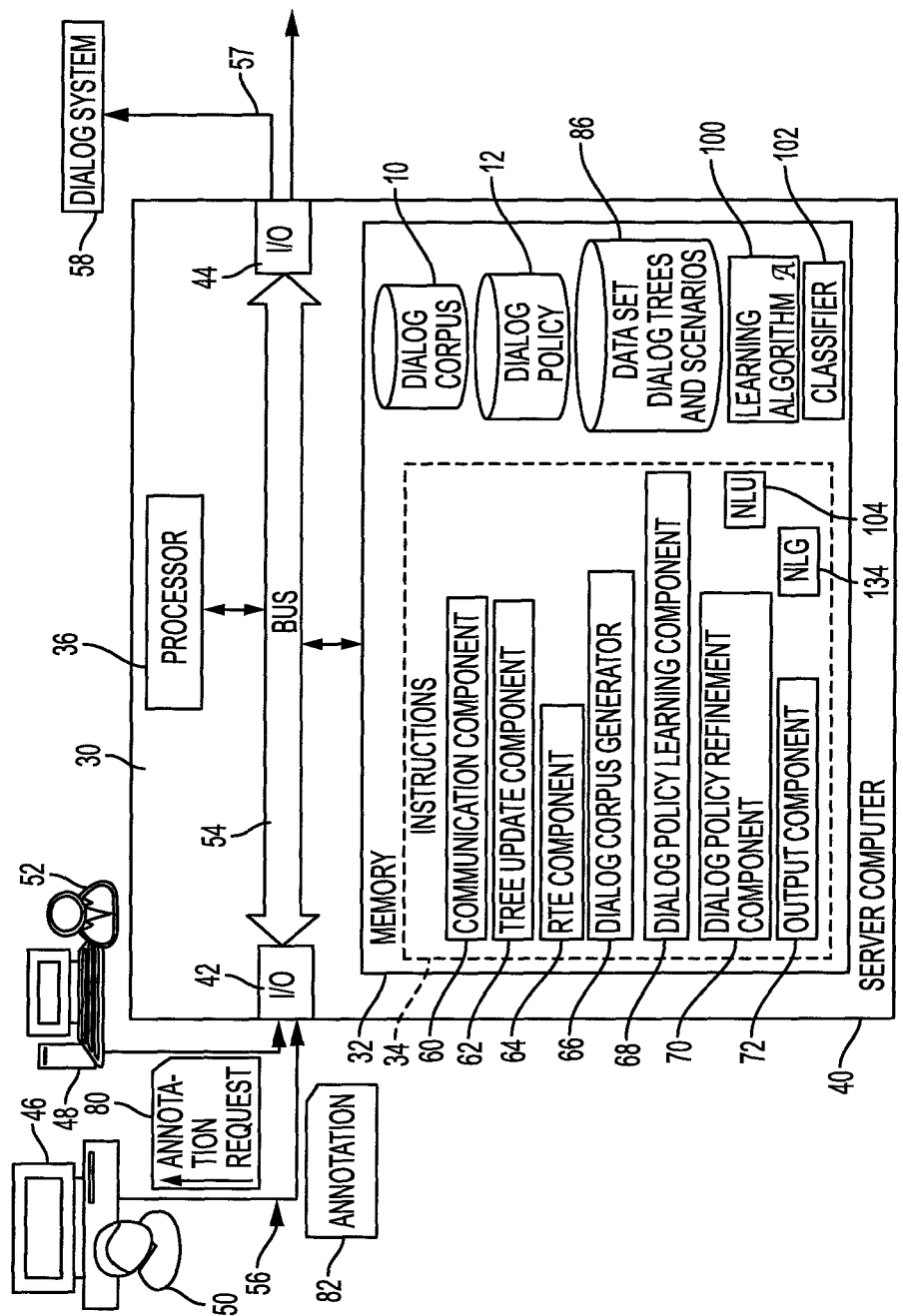
FIG. 2 is a block diagram of a system for generating dialogs and determining a dialog policy in accordance with another aspect of the exemplary embodiment.

With reference to FIG. 1, a dialog policy generation method is illustrated, which can be performed with the system of FIG. 2. The method begins at S100.

At S102, which is discussed in greater detail with reference to FIG. 3, dialogs are generated for each of a set of scenarios, using a reactive learning method in which dialog tree for each of the scenarios is progressively expanded by adding one new node at each of a set of iterations.

At S104, a dialog corpus 10 (which may be referred to herein as a WOZ corpus) is assembled from the dialog sequences.

At S106, a dialog policy 12 is generated for the set of scenarios, using the dialog corpus 10 generated at S104. Different methods for generating (or "bootstrapping") the dialog policy are available, such as direct supervised learning (S108), to learn an SL dialog policy 14, and/or supervised learning (S110) of a simulated environment 16, followed by reinforcement learning (S112) of an RL dialog policy 17.

Given the initial dialog policy 12 learned on the corpus 10, the dialog policy may be refined at S114. Various methods of dialog policy refinement can be employed, such as testing in a simulation (S116) to produce a simulated dialog corpus 18, which can be used to refine the dialog policy. The dialog policy produced at S106 or S116 can be tested with real users (e.g., customers) (S118), to produce a real user corpus 20, which can be used to refine the dialog policy. Meta evaluation (S120) may be performed to determine whether the evaluation function reflects real user preferences.

At S122, the original or refined dialog policy 12 is output and may be incorporated in a dialog system. The method ends at S124.

With reference now to FIG. 2, a system 30 for generating a dialog corpus 10 suitable for learning a dialog policy 12 is shown. The system includes memory 32 which includes instructions 34 for performing the exemplary method and a processor 36, in communication with the memory 32, for executing the instructions. The system may be hosted by one or more computing devices, such as the illustrated server computer 40, and include one or more input/output devices 42, 44, for communicating with external devices, such as annotator devices 46, 48, etc., operated by respective annotators 50, 52, etc. Hardware components 32, 36, 40, 44 of the system may communicate via a data/control bus 54. External connections 56, 57 may be wired or wireless, e.g., via a local area network or a wide area network, such as the Internet.

The Wizard of Oz method is used herein for generating the dialogs. In this method, a human wizard mimics the functions of a dialog system 58, either entirely or in part, which makes it possible to evaluate potential user experiences and interaction strategies without the need for building a fully functional product first. The human annotators 50, 52, etc. that serve as the wizards, may be experts, i.e., people with some knowledge of a dialog system 58 that will ultimately make use of the dialog policies in conducting dialogs between a human user of the dialog system and a virtual agent. A typical dialog conducted by a dialog system includes a sequence of utterances, generated, in turn, by a virtual agent and a user, such as a customer. In the generation of the dialog corpus 10, the annotators serve as proxies for the virtual agents and the users, selecting the next utterance of a dialog, based on the current state of the dialog (what has been said up to that point) and the ultimate goal of the dialog, which is known by the annotators.

Briefly, the instructions 34 include a communication component 60, a dialog tree update component 62, a reactive tree expansion component 64, a dialog corpus generator 66, a dialog policy learning component 68, a dialog policy refinement component 70, and an output component 72.

The communication component 60 serves as a front end of the system 30, sending annotation requests 80 to selected ones of the annotators and receiving annotations 82 from them. The annotation request is a request for an annotation or label 82 to be provided by the annotator, which could serve as the next utterance in a given dialog. While the communication component 60 is illustrated in FIG. 2 as software of the system, it could be web-based, with information being sent back to the system.

Figure 4:
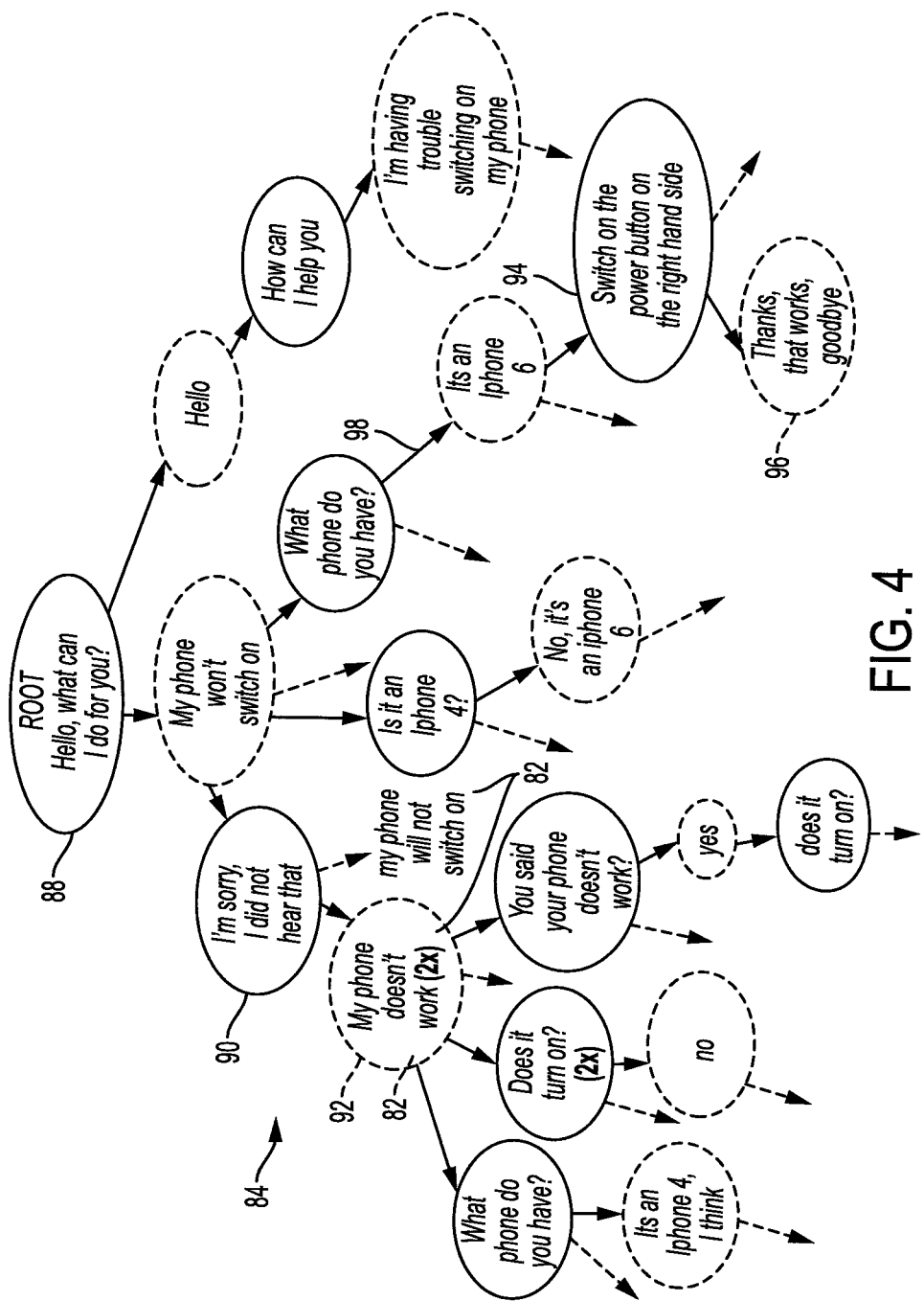
FIG. 4 illustrates a dialog tree for a given troubleshooting scenario.

The tree update component 62 uses the annotations 82 provided by the annotators to build a dialog tree 84, which may be stored in a data set 86 which includes dialog tree(s) and scenarios. As illustrated in FIG. 4, a dialog tree 84 is built for each of a set of scenarios, each scenario generally relating to a class of dialogs related to a particular context and goal. Each scenario has a context, which describes the issue the user is seeking help with, such as such as "phone will not switch on" and a goal, such as "propose solution for switching phone on."

Each dialog tree 84 includes a root node 88 and a set of child nodes 90, 92, 94, 96, etc. Each child node 90, 92, 94, 96 represents a turn of a dialog. Each child node has a single parent node. Each child node 90, 92, 94, other than a terminal node 96, which signifies the end of a dialog, is connected to one or more child nodes. The nodes of the tree include agent nodes 90, 94 (shown as solid ovals) and user nodes 92, 96, etc. (shown as dashed ovals). Each path 98 from the root node 88 to a terminal node 96 corresponds to a complete respective dialog. The illustrative dialog tree 84 shown in FIG. 4 is in an early stage of generation, the dashed arrows indicating possible further extensions of the tree.

The reactive tree expansion (RTE) component 62 samples a node of a current dialog tree for labeling by one of the annotators. For example, the RTE component may select node 90 and assign it to annotator 50, who provides a label 82 which corresponds to what the user may say at that point in the dialog. The label 82 may be the same as one of the existing child nodes 92, such as My phone doesn't work, in which case a counter associated with node 92 may be incremented. Or, it may be a previously unseen label, which is used to generate a new child node which is appended to node 90. The method for selecting the next node to label, referred to herein as reactive learning, is described in further detail below and includes selection of the next {scenario, node} couple to expand, based on an annotation provided by selected annotator λ.

The dialog corpus generator 66 generates a dialog corpus 10 from the dialog tree for a given scenario. Each completed path through the tree is added to the corpus 10 as a separate dialog.

The dialog policy learning component 68 uses the dialog corpus 10 for the scenarios to learn the dialog policy 12 (S106). See, for example, Jason D. Williams, et al., "Using Wizard-of-Oz simulations to bootstrap reinforcement-learning-based dialog management systems," Proc. SIGDIAL Workshop on Discourse and Dialogue, 2003, for a discussion of a reinforcement learning approach to dialog policy generation. The dialog policy learned is a mapping function which predicts the label (next action) for a current state of a dialog. A learning algorithm 100 may be used to learn the dialog policy, which then serves as a classifier model for a classifier 102.

The refinement component 70 refines the learnt dialog policy by testing it in simulation with virtual agents and virtual users, and/or with virtual agents and real users (S114).

One or more of the dialog policy learning component 68 and the dialog policy refinement component 70 may be omitted if the tasks they perform (S106, S114) are to be performed elsewhere.

The computer system 30 may include one or more computing devices 40, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 32 may represent any type of non-transitory computer readable medium such as random access memory (RAM), read only memory (ROM), magnetic disk or tape, optical disk, flash memory, or holographic memory. In one embodiment, the memory 32 comprises a combination of random access memory and read only memory. In some embodiments, the processor 36 and memory 32 may be combined in a single chip. Memory 32 stores instructions for performing the exemplary method as well as the processed data 10, 12.

The network interface 42, 44 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 36 can be variously embodied, such as by a single-core processor, a dual-core processor (or more generally by a multiple-core processor), a digital processor and cooperating math coprocessor, a digital controller, or the like. The digital processor 36, in addition to executing instructions 34 may also control the operation of the computer 40.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The Wizard of Oz approach to data collection is useful in the context of autonomous dialog system design. The data collection in a WOZ experiment does not require a working prototype but simply a definition of the scenario, tasks and eventually a dialog act schema. It allows optimal strategies to be learnt for domains where no working dialog system already exists. It enables an acceptable initial dialog policy to be generated before starting a full reinforcement learning (RL) of the dialog policy. This independence from large amounts of in-domain dialogue data allows RL to be applied to new application areas beyond the scope of existing dialogue systems. Use of human annotators allows less restricted exploration of dialogue policies than is achievable with a hand-coded strategy for data-collection, which provides limited variation. In addition, the WOZ approach can include a controlled experimental setup which can be designed to anticipate closely the final dialog system setup.

The present reactive learning method addresses a significant problem conventional WOZ approaches, which is the effort of dialog generation. The exemplary system and method focus the work of the annotators towards the dialog steps and scenarios that are predicted to generate the most conflict between annotators or between the annotators and a given learned dialog policy generated from already generated data.

Figure 3:
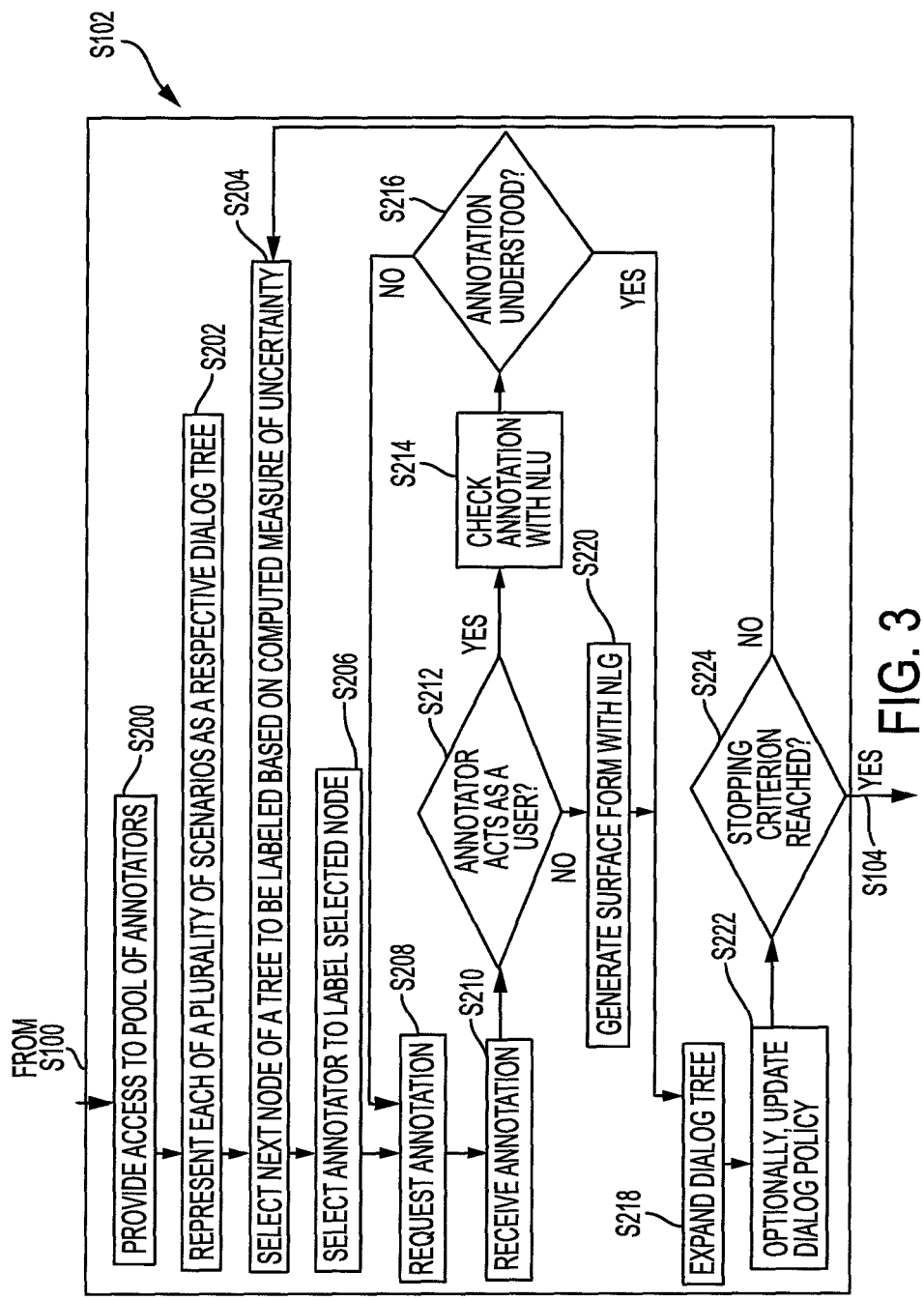
FIG. 3 is a flow chart illustrating generating dialogs in the method of FIG. 1.

FIG. 3 illustrates the generation of dialog sequences through reactive learning in accordance with one aspect of the exemplary embodiment.

At S200, access is provided to a pool of annotators 50, 52, etc.

At S202, dialogs for a set of scenarios are represented as a dialog tree 84. Initially, each dialog tree 84 may have a single root node 88, with child nodes added as labeling progresses.

At S204, a next node to be labeled is selected, based on a computed measure of uncertainty of nodes in the dialog trees. Two methods are proposed for the computation of uncertainty for each of the current nodes in a dialog tree: (1) a data-centric sampling strategy, which considers the variation in the subtree of each node, and (2) a model-centric sampling strategy, which models the dialog policy over each dialog tree and identifies a node whose subtree is most at variance with the tree's current dialog policy. In particular, the method identifies a node for which the label 82 is relatively unlikely to be correctly predicted by a current dialog policy. The higher the probability that the label would be incorrect, the more likely that node is to be selected. Further details on these methods are provided below.

At S206, an annotator from the pool is selected to provide the next annotation 82 for the selected node in one of the dialog trees.

At S208, the annotator selected is requested to provide the annotation for the selected dialog tree and node and at S210, the annotation 82 is received from the annotator. If the annotator is acting as a user (S212), the annotator may respond with free text, in which case, the method proceeds to S214 to check the annotation is understandable by the system, using the NLU unit 104. If at S216 it is not, the annotator may be asked to reword the annotation, or the request may be sent to another annotator. Otherwise, the method proceeds to S218. As will be appreciated, different annotators serving as the virtual agent may ask questions in a different order for the same scenario. For example, one annotator may seek to identify the device early on while another may seek to identify the problem the user is trying to resolve.

If at S212, the annotator acts as an agent, the method proceeds to S220, where the dialog act selected by the annotator from a set of dialog acts is used to generate a surface form that is appropriate to the scenario. The method then proceeds to S218.

At S218, the dialog tree 84 is expanded, based on the new annotation, by the tree update component 64. The expansion creates a new node. The text of the new node is based on the annotator's free text, in the case of a user annotation (optionally after automated corrections, such as correcting typographical and/or grammatical errors), or using the surface form, in the case of an agent annotator.

At S222, the learning algorithm 100 may update the current dialog policy, based on the new annotation (in the case of reactive learning method 2).

At S226, if a stopping criterion has not been reached, the method returns to S204, otherwise to S104. The stopping criterion may be a budgeted time, a total number of annotations, a threshold number of nodes or dialog paths on each dialog tree, or a combination of two or more criteria.

Further details of the system and method will now be described.

Reactive Learning

The general process of reactive learning is described, for example, in Panagiotis, et al., "Repeated labeling using multiple noisy labelers," Data Min. Knowl. Discov, 28(2): 402-441, 2014; Christopher H. Lin, et al., "To re(label), or not to re(label)," 2nd AAAI Conf. on Human Computation and Crowdsourcing (HCOMP), 2014; Victor S. Sheng, et al., "Get another label? Improving data quality and data mining using multiple, noisy labelers," Proc. 14th ACM SIGKDD Intl Conf. on Knowledge Discovery and Data Mining, pp. 614-622, 2008; Peng Dai, et al., "POMDP-based control of workflows for crowdsourcing," Artif. Intell, 202:52-85, 2013.

Reactive learning may be applied in the present context as follows:

Let $\mathcal{X}$ denote the space of examples, which in the present case are the nodes 88, 90, 92, 94, 96, etc. of the current dialog trees 84. Let $\mathcal{Y} \in \mathbb{E}$ be a set of labels 82, and D, a probability distribution over the examples $\mathcal{X}$ 88, 90, 92, 94, 96, etc. The labels y may be drawn from a fixed set $\mathbb{E}$, e.g., in the case of the labels selected by the annotators when serving as virtual agents, while the annotators serving as users may be permitted to use free text in generating annotations (these annotations may be passed to a natural language understanding (NLU) component 104 to make sure they can be understood by the system).

Let the true hypothesis (ideal dialog policy 12) to be learned be $h^* = \mathcal{X} \to \mathcal{Y}$. This is a mapping function which relates each example (node) x in space $\mathcal{X}$ to its true label (annotation) in set $\mathcal{Y}$. Let $\mathcal{H}$ be a set of dialog policy hypotheses h, from which the learning algorithm 100, denoted $\mathcal{A}$, tries to select the hypothesis $h \in \mathcal{H}$ that minimizes the error $e(h) = P_{x:D}(h(x) \neq h^*(x))$, i.e., minimizes the probability, over all examples x that the hypothesis h(x) for that example is not the correct one $h^*(x)$.

In this setting, it can be assumed that acquiring a label for an example implies a fixed unit cost. It is also assumed that each label is independently flipped from the true label given by $h^*(x)$ to another label, with probability 1−a, a may be the accuracy of the source (annotator) of the labels, i.e., the probability of the given annotator assigning a correct label, a is greater than 0 and less than 1, such as at least 0.5. For example, $a \in (0.5;1.00)$. For computing the probability, it is assumed that each annotator's accuracy is known, or that some approximation thereof can be obtained.

Let $\mathcal{X}_L \subseteq \mathcal{X}$ denote the current set of labeled examples (i.e., those nodes with at least one child node). Let $\mathcal{X}_U = \mathcal{X} - \mathcal{X}_L$ denote the set of unlabeled examples (i.e., those nodes no child node). Let $L = \{(x_i, y_i)\}$ denote the multiset of example and label pairs. For each $x_i \in \mathcal{X}_L$, let $$L_{x_i} = \{l_i^1, \ldots, l_i^{\tau_i}\}$$

be the multiset of labels for that example $x_i$, where $\tau_i$ is the number of labels for $x_i$. Let $f(L_{x_i})$ output an aggregated label (e.g., majority vote) for an example given the noisy labels for that example. The learning algorithm $\mathcal{A}$ is run using L and the corresponding aggregated labels output by f.

Uncertainty sampling may be used as the algorithm for active learning. For a description of this approach, see David D. Lewis et al., "Heterogeneous uncertainty sampling for supervised learning," Proc. 11th Intl Conf. on Machine Learning, pp. 148-156, 1994; Burr Settles, "Active Learning. Synthesis Lectures on Artificial Intelligence and Machine Learning," pp. 1-114, Morgan & Claypool, Publishers, 2012. To pick the next example (node) to label, this method computes a measure of the classifier 102's uncertainty for each example in the unlabeled set, $\mathcal{X}_U$, and then returns the most uncertain one. Let $M_A(x)$ denote the entropy of the probabilities from the learning algorithm for an example x. Let $S\mathcal{X}_U$ denote the strategy that returns the example in $\mathcal{X}_U$ with highest entropy: arg $\max_{x \in \mathcal{X}_U} M_A(x)$.

This methodology is extended herein to reactive learning, where the annotator is now part of the sampling decision, for the problem of active tree expansion and applying it to the task of dataset construction for efficient imitation-based policy learning in autonomous and task-oriented dialog systems. To do so, two strategies can be used, the first is a data-centric method and the second is a model-centric method, as described below.

Reactive Dialog Tree Expansion

An annotation task includes asking a human annotator to write or otherwise select the next utterance $u_{t+1} \in U$ to express as an agent or a user on a given task-oriented dialog scenario (S208). The task of an annotator $\lambda$ can be summarized as choosing, for a given dialog scenario $S_t \in \mathbb{S}$ at given step t of the interaction, a dialog act $u \in \mathcal{U}$, considering an overall scenario description defining the purpose of the dialog and the sequence of prior utterances from $[T_0, \ldots, T_{t-1}]$. From an annotation framework perspective, a set of annotators is dedicated to this task and the problem, at S204-S206, is to choose the next triple $\{\lambda_k, s_k, t_k\}$ defining the next dialog scenario $s_k$ at a given time of the interaction $t_k$ to assign to an annotator $\lambda_k$, considering a set of already produced triples $\mathcal{T}$ and a dialog policy π to learn from the Woz Corpus. As noted above, the underlying produced structure is a dialog tree where the root is the agent opening and one tree is produced for each considered dialog scenario (or for a set of two or more scenarios). Such a setting allows production of different dialog act decisions, proposed by different annotators, for a given scenario and given an already produced sequence of utterances.

The main advantage of this approach, compared to classical active learning, is to take into account explicitly the inter-annotator variance at a given node of a produced dialog tree and explicitly estimate the information gain associated with an annotation at a given node. While active learning aims at determining only the next $x \in \mathcal{X}$ to annotate, in reactive learning, the couple $\{x, \lambda\}$ is considered.

Figure 5:
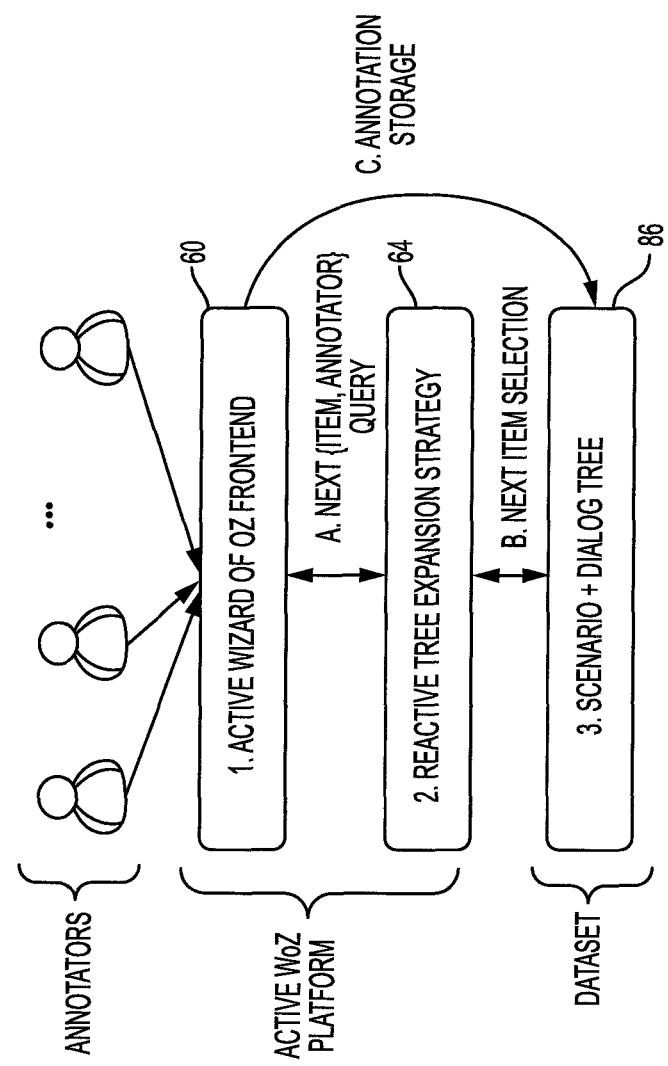
FIG. 5 graphically illustrates an Active Wizard of Oz architecture.

As illustrated in FIG. 5, the reactive annotation employs a three-tier architecture which includes (1) a front-end, (2) a reactive sampling strategy for selection the next {scenario, node} couple to expand, with respect to a given annotator λ and (3) a dataset composed of the scenarios and respective dialog trees.

Two rank-based sampling strategies for {scenario, node, λ} triple selection are given, by way of example. In the first, based on the current dialog tree asymmetries, the next node to extend is chosen as a function of the inter-annotator disagreement. In the second approach, based on a current learnt policy $\pi: S \rightarrow \mathcal{A}$, the branch of maximum uncertainty is expanded.

1. Data-Centric Sampling Strategy

In the first proposed approach, the reactive tree expansion decision strategy computes the conflict coefficient $C_j$ of a node j which quantifies the diversity of its child-node set, e.g., as defined in Equation 1:

$$C_j = \max_j(n) - \frac{1}{k}\sum_{i=1}^{k}(n_i - \hat{n})^2 \quad (1)$$

where $\max_j(n)$ is the maximum size, computed in number of branches, of any subtree from the node j, k is the number of child nodes of node j, $n_i$ is the number of child nodes (the number of branches) of one of these child nodes, $\hat{n}$ is the mean number of child nodes of the subtree started with each child of node j.

For example, in FIG. 4, $\max_j(n)$ of the node 92 is 3, which is the number of utterances in the right hand branch. Node 92 has three child nodes, i.e., k is 3. Each of these child nodes has a subtree containing one node, except for the right-hand one, which has two. The mean number of nodes $\hat{n}$ is therefore $$\frac{1+1+2}{3}.$$

Thus, for node 92:

$$C_j = 3 - \frac{1}{3}\sum_{i=1}^{k}\left(1-\frac{4}{3}\right)^2 + \left(1-\frac{4}{3}\right)^2 + \left(2-\frac{4}{3}\right)^2 =$$

$$3 - \frac{1}{3}\sum_{k=1}^{k} 0.11 + 0.11 + 0.44 = 2.8$$

The conflict coefficient is thus inversely proportional to the variance of each node $n_j$, which is a function of the size of the sub-tree, computed in number of branches, of the child-node set of a candidate node j. In the search for an optimal strategy, the goal is favor the expansion of the region with the most uncertainty over the action set. The method may thus include identifying one of the nodes whose conflict coefficient is the lowest or at least lower than other nodes for labeling.

When one node is used more than one time in a given tree corresponding to a given dialog context, the node is not duplicated in order to keep the different computations consistent.

2. Model-Centric Sampling Strategy

The second sampling strategy assumes the learning of an imitative dialog policy: $\pi: \{S, A\} \rightarrow \mathbb{R}$, with S being a vector space describing the dialog state at a given utterance, A the set of eligible actions (labels) and it a ranking function of actions $a_t$ at an observed state $s_t$. See, for example, Adam Coates, et al., "Apprenticeship learning for helicopter control," Commun. ACM, 52(7):97-105, 2009; Gergely Neu, et al., "Apprenticeship learning using inverse reinforcement learning and gradient methods," CoRR, abs/1206.5264, 2012; Takaki Makino, et al., "Apprenticeship learning for model parameters of partially observable environments," ICML, pp. 1495-1502, 2012.

The Discounted Cumulative Gain, as defined in Equation 2, is computed as a measure of uncertainty. The dialog policy response list $l^\pi$ of size M at a given node and the current annotations at a given state $s_t$ are used as the criteria of selection for the next node to expand. See, for example, Ellen M. Voorhees, "Evaluation by highly relevant documents," Proc. 24th Ann. Int'l ACM SIGIR Conf. on Research and Development in Information Retrieval, pp. 74-82, 2001; Georges Dupret, et al., "Model based comparison of discounted cumulative gain and average precision," J. Discrete Algorithms, 18:49-62, 2013. In the present context, the relevance of a proposed dialog move i, denoted $rel_i$, is defined as the size of the sub-tree, computed as the total number of its branches, starting from the state resulting from choosing such action.

$$DCG_{l^\pi} = \sum_{i=1}^{M} \frac{2^{rel_i}-1}{\log_2(i+1)} \quad (2)$$

where M is the actual number of already chosen dialog moves at the considered node of the tree. M is thus the current number of child nodes of node j in the tree. $rel_i$ is the relevance of a proposed dialog move i, computed as the size of the sub-tree, e.g., computed as the total number of branches, starting from the state (node) resulting from choosing such action.

Indeed, while the complete list of possible dialog acts can be ranking by the learnt policy the conflict computation between the policy and the actual chose of the annotation is performed using the already chosen dialog act at the considered node.

The DCG is a ranking error for a node j in the tree. When the DCG is the lowest, this indicates that the dialog policy has the most difficulty in predicting the annotators' labels. This node is selected as the next node to select.

For example, for node 92 in FIG. 4, starting from node "my phone won't switch on" M is 2.

The learnt dialog policy should, in general, favor the actions where the most subsequent branches have already been developed. In this case, the purpose is to explicitly increase the training size in this uncertainty region of the policy. Finally, to ensure an exploration-exploitation tradeoff, an Upper Confidence Bound strategy over the DCG calculation is used to determine the next node to sample. See, for example, Peter Auer, "Using confidence bounds for exploitation-exploration trade-offs," J. Machine Learning Res., 3, 397-422 (2002); Peter Auer, "Using confidence bounds for exploitation-exploration trade-offs," J. Mach. Learn. Res., 3:397-422, March 2003; Pierre-Arnaud Coquelin, et al., "Bandit Algorithms for Tree Search," Uncertainty in Artificial Intelligence, Vancouver, Canada, pp. 67-74, 2007.

In one embodiment, a composite strategy in the form of a linear combination between the two reactive learning approaches can be employed. In such an approach, the coefficient could be determined with respect to the size of the already produced dataset.

The annotator for providing the annotation for the selected node may be selected (e.g., randomly) from the pool of annotators who have not yet provided an annotation for that node. In some embodiments annotator selection may take into account features of the candidate annotators, such as the extent to which they have provided different annotations to the annotators that have already provided an annotation for that node. As a result, different annotators will serve as a respective one of the virtual agent and user in one or more of the dialog tree paths.

As will be appreciated, the reactive learning approach need not be used for generation of every node. For example, to initialize each tree a set of annotators may be requested to provide a respective label for generating a node at the first level. In some embodiments, the reactive learning method may be alternated with other label generating methods, such as picking a node and an annotator (or two or more annotators) at random. In some embodiments, a batch reactive learning approach is used. In this approach, more than one node is selected for labeling, such as the two giving the greatest uncertainty measure, and labels are then requested from respective annotators before updating the tree(s) with both annotations. While this may be less effective than adding each new node before sampling the next node to be labeled, it may be suited to cases where there is a time constraint.

The method illustrated in FIGS. 1 and/or 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 40, (for example, an internal hard drive of RAM), or may be separate (for example, an external hard drive operatively connected with the computer 40), or may be separate and accessed via a digital data network such as a local area network (LAN) or the Internet (for example, as a redundant array of inexpensive of independent disks (RAID) or other network server storage that is indirectly accessed by the computer 40, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 1 and/or 3, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Applications

Various applications are contemplated for the exemplary system and method.

Figure 6:
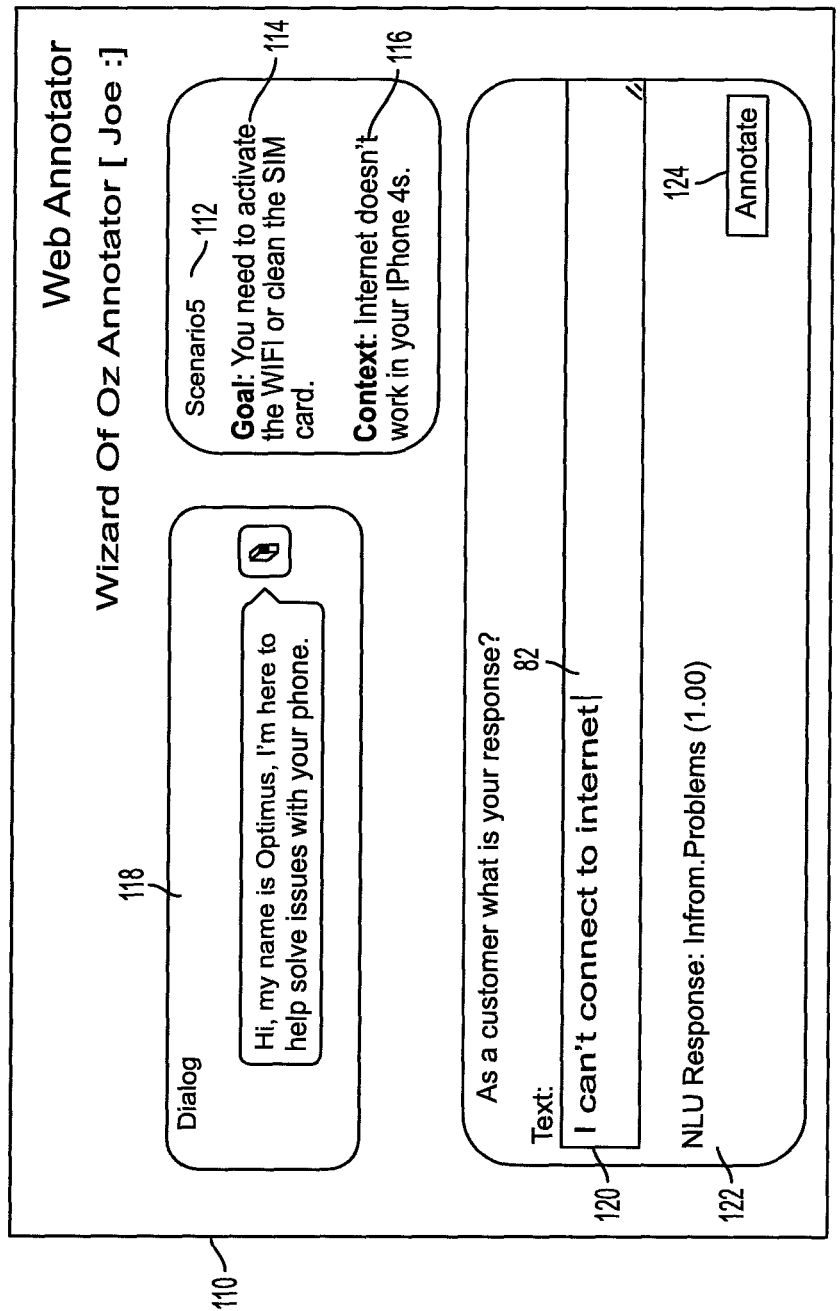
FIG. 6 illustrates a graphical user interface in a web implementation, for the customer side.

In one example application, dialogs are produced for device troubleshooting. In this context, a scenario is summarized by a Context that describes the customer situation at the beginning of the interaction and Goal which is the solution that the agent is supposed to identify at the end of the interaction. FIG. 6 shows a user interface 110 which may be displayed to an annotator who is serving as a user (customer in this case). The interface displays the scenario 112 including a context 114 and a goal 116. The previous turn(s) of the dialog are displayed in a dialog box 118. The annotator writes the chosen utterance 82 in a text entry box 120. The Natural Language Understanding component 104 verifies the usability of the given utterance in terms of dialog act classification capability, which may be displayed to the annotator as shown at 122. If the NLU component has not understood the utterance, the utterance may be ignored. Once the annotator is satisfied with the text, an "annotate" icon 124 is actuated to submit the annotation.

Figure 7:
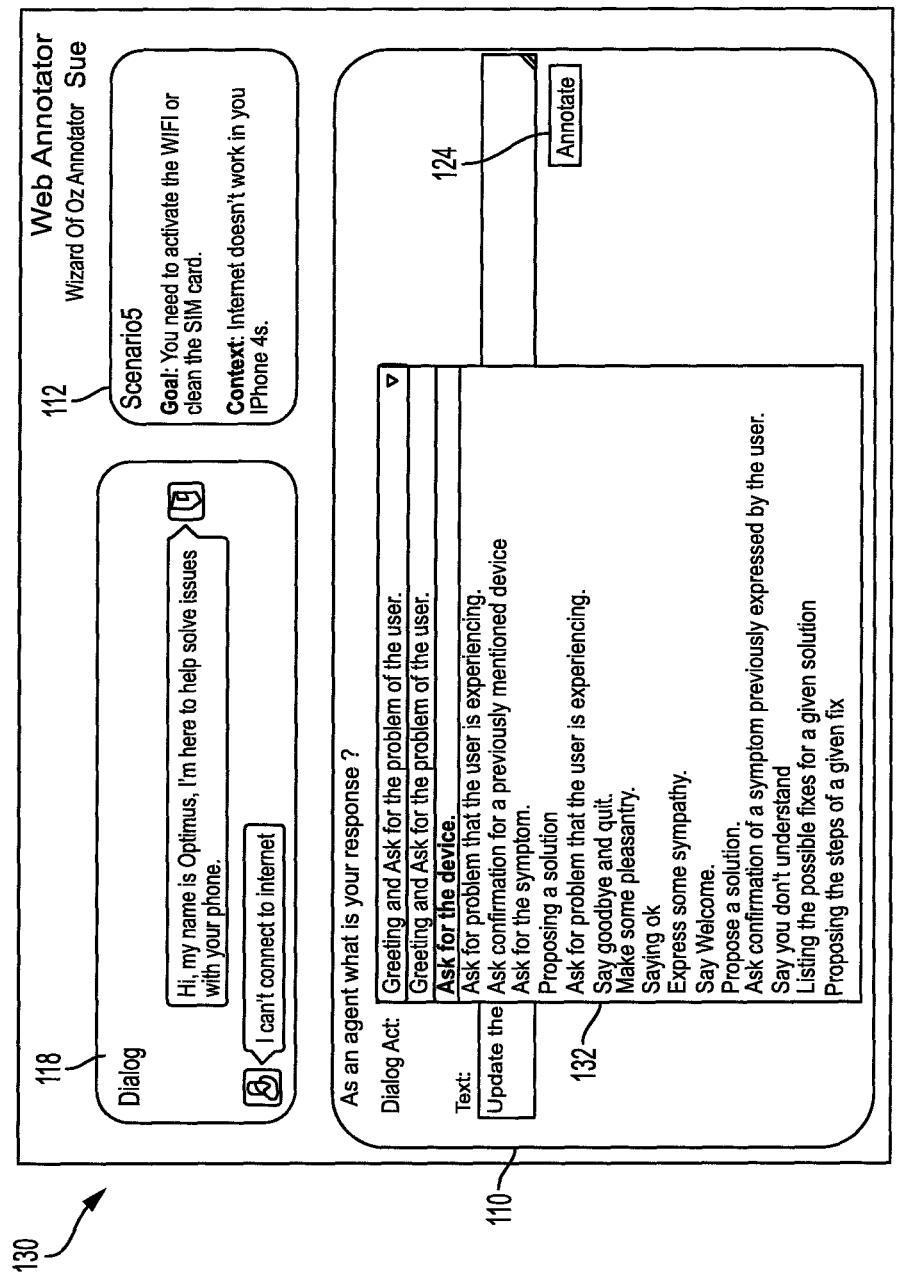
FIG. 7 illustrates a graphical user interface in a web implementation, for the call-center agent side, during dialog act selection.
Figure 8:
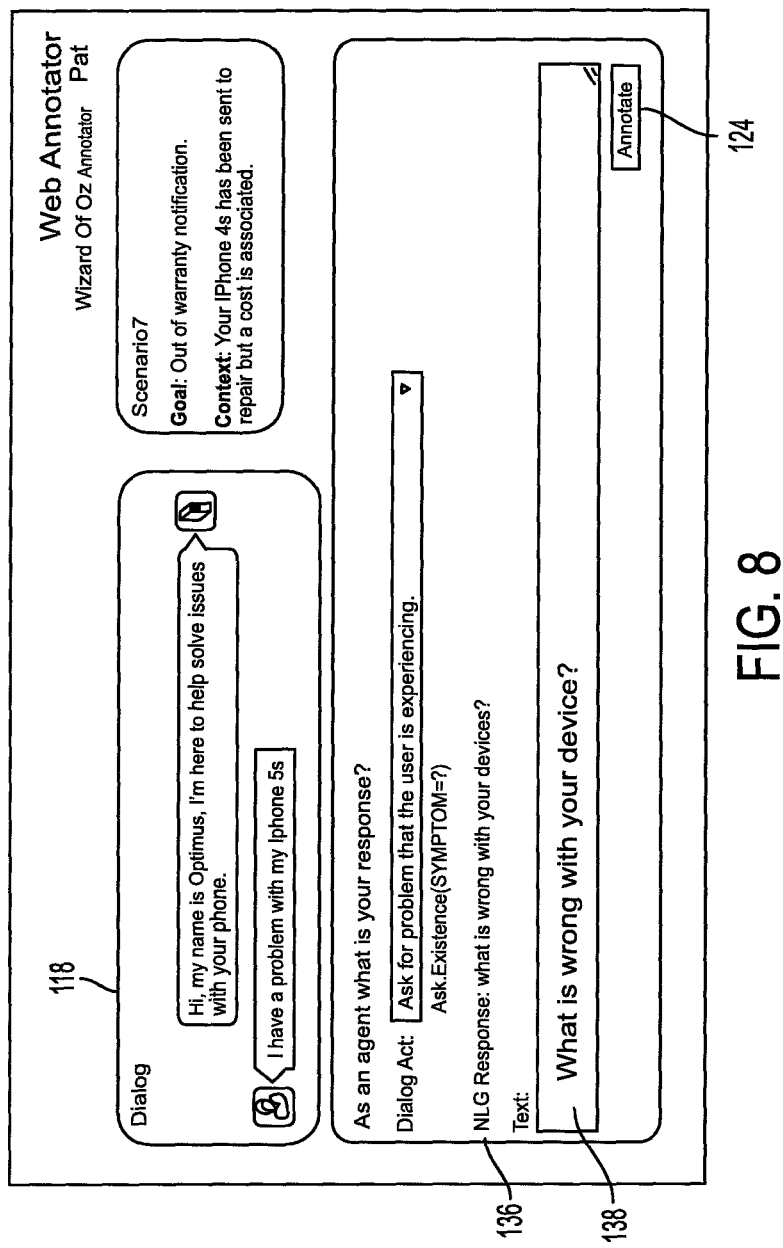
FIG. 8 illustrates a graphical user interface in a web implementation, for the call-center agent side, during surface realization after dialog act selection.

FIGS. 7 and 8 show a user interface 130 which may be displayed to an annotator who is serving as a (virtual) call-center agent in the agent side of the system. The interface is similar, in many respects, to the interface 110 displayed to the customer annotator. In this case, however, a set of predefined intentions, dialog acts are eligible, and may be displayed to the annotator in a drop down menu 132. A natural language generation (NLG) component 134 (FIG. 2) is in charge of producing a surface realization 136 of the chosen dialog act. Then, the annotator is able to modify the generated surface realization of this utterance in text box 138. Finally, the annotator, by clicking on the "annotate" button 124, generates the annotation, which becomes a new node in the dialog tree associated with the given scenario.

Due to the sparse character of natural language data, a particular challenge to automation in troubleshooting is to design efficient strategies of learnable dataset construction in order to achieve fully automated dialog platforms for customer care services. The present system and method address this problem by implementing a reactive learning model based Wizard of Oz platform. The resulting platform has been implemented as a prototype.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating dialogs and learning a dialog policy for a dialog system, comprising:
  for each of at least one scenario, in which annotators in a pool of annotators serve as virtual agents and users, generating a respective dialog tree in which each path through the tree corresponds to a dialog and nodes of the tree correspond to turn of a dialog, the generation comprising, with a processor:
    a) computing a measure of uncertainty for nodes in the dialog tree, comprising:
      for each of a plurality of nodes, computing a conflict coefficient $C_i$ which quantifies the diversity of its child-node set, as a function of:

$$\max_j(n) - \frac{1}{k}\sum_{i=1}^{k}(n_i - \hat{n})^2$$

where $$\max_j(n)$$

is the maximum size of any subtree from the node j, k is the number of child nodes of node j, $n_i$ is the number of child nodes of one of these child nodes, $\hat{n}$ is the mean number of child nodes of the subtrees that have as root the child nodes of the considered node j;
- b) identifying a next node to be annotated, based on the measure of uncertainty,
- c) selecting an annotator from the pool to provide an annotation for the next node,
- d) receiving an annotation from the selected annotator for the next node, and
- e) generating a new node of the dialog tree based on the received annotation;

generating a corpus of dialogs from the dialog tree;
learning a dialog policy based on the corpus of dialogs; and
incorporating the learned dialog policy into a dialog system for conducting a dialog between a virtual agent and a user, in which the learned dialog policy predicts, based on a state of the dialog, a next action to perform, the action being converted, by the dialog system, to a next utterance of the virtual agent.

2. The method of claim 1, wherein the at least one scenario comprises a plurality of scenarios and the computing of the measure of uncertainty is performed for nodes of the respective dialog trees and the identifying a next node to be annotated is performed using the computed measure of uncertainty for the nodes of all of the plurality of dialog trees.

3. The method of claim 1, wherein the computing of the measure of uncertainty comprises at least one of:
considering the variation in the subtree of each node, and
modeling a current dialog policy for each dialog tree and identifying a node whose subtree is most at variance with the current dialog policy.

4. The method of claim 1, wherein the identifying a next node comprises identifying one of the plurality of nodes whose conflict coefficient is lowest or which is at least lower than other nodes in the plurality of nodes.

5. The method of claim 1, wherein the selecting of the annotator from the pool comprises selecting the annotator from annotators in the pool that have not provided an annotation for the selected node.

6. The method of claim 1, wherein each node of the dialog tree has only a single parent node and at least 0 child nodes, and wherein as the tree is expanded, at least some of the nodes have at least two child nodes.

7. The method of claim 1, wherein steps a)-e) are repeated a plurality of times.

8. The method of claim 1, further comprising generating a user interface for display to the selected annotator for receiving the annotator's annotation.

9. The method of claim 8, wherein the user interface provides a goal of the scenario and a current state of the dialog.

10. The method of claim 1, further comprising conducting a dialog based on the dialog policy, wherein the dialog policy is used to generate a dialog act of the virtual agent in response to the user's utterance.

11. The method of claim 1, further comprising outputting at least one of:
the corpus of dialogs; and
a dialog policy generated based on the corpus of dialogs.

12. A computer program product comprising a non-transitory medium storing instructions, which when executed by a computer processor, perform the method of claim 1.

13. A system comprising memory which stores instructions for performing the method of claim 1 and a processor in communication with the memory for executing the instructions.

14. In combination, a system for generating dialogs for learning a dialog policy and a computer-implemented dialog system, the system for generating dialogs comprising:
memory which stores a dialog tree for each of a plurality of scenarios, wherein paths through the tree correspond to respective dialogs and nodes of the tree each represent a turn of a dialog, whereby some of the nodes correspond to user annotations and others of the nodes correspond to agent annotations;
a tree update component for updating the dialog trees based on annotations of annotators in a pool of annotators serving as virtual agents and users;
a reactive tree expansion component which progressively expands the dialog trees by repeated selection of a next node to be annotated by one of the annotators in the pool, the next node being selected based on a respective computed measure of uncertainty for each of the current nodes in one of the dialog trees, whereby when the next node corresponds to a user annotation, a text annotation is provided by the selected annotator for the next node, and when the next node corresponds to an agent annotation, a dialog act is selected by the selected annotator for the node;
a dialog corpus generator which generates a corpus of dialogs from the expanded dialog trees;
a dialog policy learning component which learns a dialog policy based on the corpus of dialogs, the learning of the dialog policy including learning a classifier model which predicts a next action for a current state of a dialog; and
a processor which implements the tree update component, reactive tree expansion component, and dialog corpus generator;
the dialog system being configured for conducting a dialog between a virtual agent and a user, in which the learned dialog policy predicts, based on a state of the dialog, a next action to perform, the action being converted, by the dialog system, to a next utterance of the virtual agent.

15. The method of claim 14, wherein the computing of the measure of uncertainty comprises computing a ranking error according to:

$$DCG_{f^\pi} = \sum_{i=1}^{M} \frac{2^{rel_i} - 1}{\log_2(i+1)}$$

where $rel_i$ is the relevance of a proposed dialog move i, computed as the size of the sub-tree, computed as the total number of its branches, starting from the state resulting from choosing such action, and M is the number of child nodes of node i in the tree.

16. The system of claim 14, further comprising at least one of:
a dialog policy refinement component which refines the learned dialog policy; and
an output component which outputs at least one of:
the corpus of dialogs; and
a dialog policy generated based on the corpus of dialogs.

17. In a dialog system which conducts dialogs between a human user of the dialog system and a virtual agent, a dialog policy learned by a method comprising:
storing a respective dialog tree in memory for each of a plurality of scenarios, wherein paths through the tree correspond to respective dialogs and nodes of the tree each represent a turn of a dialog, some of the nodes corresponding to user annotations and others of the nodes corresponding to agent annotations;
progressively expanding the dialog trees by repeated selection of a next node to be annotated by one of a pool of annotators, the next node being selected based on a respective computed measure of uncertainty for each of the nodes currently in the dialog trees, and updating the dialog trees based on the annotation of the one annotators in the pool of annotators, whereby when the next node corresponds to a user annotation, the selected annotator is requested to provide a text annotation for the next node, and when the next node corresponds to an agent annotation, the selected annotator is requested to select a dialog act for the node;
generating a corpus of dialogs from the expanded dialog trees; and
learning a dialog policy based on the corpus;
the dialog system being configured for conducting a dialog between a virtual agent and a user, in which the learned dialog policy predicts, based on a state of the dialog, a next action to perform, the action being converted, by the dialog system, to a next utterance of the virtual agent.

18. A method for learning a dialog policy for a dialog system comprising:
for each of at least one scenario, in which annotators in a pool of annotators serve as both virtual agents and users, generating a respective dialog tree in which each path through the tree corresponds to a dialog and nodes of the tree correspond to turn of a dialog, the generation comprising:
a) computing a measure of uncertainty for nodes in the dialog tree,
b) identifying a next node to be annotated, based on the measure of uncertainty,
c) selecting an annotator from the pool to provide an annotation for the next node,
d) receiving an annotation from the selected annotator for the next node, wherein when the next node corresponds to a user annotation, the received annotation is a text annotation for the next node, and when the next node corresponds to an agent annotation, the received annotation is a dialog act for the next node,
e) generating a new node of the dialog tree based on the received annotation, and
f) repeating a)-e) a plurality of times with different annotators selected from the pool;
generating a corpus of dialogs from the dialog tree; and
based on the corpus of dialogs, learning a classifier model of a dialog policy that predicts a next action for the dialog system, based on a state of a dialog; and
incorporating the learned dialog policy into a dialog system for conducting a dialog between a virtual agent and a user, in which the learned dialog policy predicts, based on a state of the dialog, a next action to perform, the action being converted, by the dialog system, to a next utterance of the virtual agent.

* * * * *